(12) United States Patent
Kingsford

(10) Patent No.: US 8,740,449 B2
(45) Date of Patent: Jun. 3, 2014

(54) COMPACT STATIC MIXER AND RELATED MIXING METHOD

(75) Inventor: Kenji Allen Kingsford, Tucson, AZ (US)

(73) Assignee: Parker-Hannifin Corporation, Cleveland, OH (US)

( * ) Notice: Subject to any disclaimer, the term of this patent is extended or adjusted under 35 U.S.C. 154(b) by 1059 days.

(21) Appl. No.: 12/679,164

(22) PCT Filed: Sep. 22, 2008

(86) PCT No.: PCT/US2008/077186
§ 371 (c)(1),
(2), (4) Date: Mar. 19, 2010

(87) PCT Pub. No.: WO2009/039477
PCT Pub. Date: Mar. 26, 2009

(65) Prior Publication Data
US 2010/0260009 A1    Oct. 14, 2010

Related U.S. Application Data

(60) Provisional application No. 60/974,125, filed on Sep. 21, 2007.

(51) Int. Cl.
*B01F 5/06*    (2006.01)
(52) U.S. Cl.
USPC ............................. 366/338; 366/340

(58) Field of Classification Search
USPC .......................................... 366/336, 338–340
See application file for complete search history.

(56) References Cited

U.S. PATENT DOCUMENTS

| | | | | |
|---|---|---|---|---|
| 1,924,038 A | * | 8/1933 | Herbsman et al. | 366/181.5 |
| 2,740,616 A | * | 4/1956 | Walden | 366/336 |
| 3,167,305 A | * | 1/1965 | Backx et al. | 366/338 |
| 4,305,672 A | * | 12/1981 | Adams | 366/336 |
| 7,513,681 B2 | * | 4/2009 | Kingsford | 366/340 |

FOREIGN PATENT DOCUMENTS

| | | |
|---|---|---|
| DE | 199 27 556 | 12/2000 |
| DE | 103 33 922 | 2/2005 |
| EP | 0 920 906 | 6/1999 |
| GB | 2 079 614 | 1/1982 |
| GB | 2 132 498 | 7/1984 |

OTHER PUBLICATIONS

International Search Report and Written Opinion of the International Searching Authority for corresponding International Application No. PCT/US2008/077186, dated Jan. 20, 2009.

* cited by examiner

*Primary Examiner* — David Sorkin
(74) *Attorney, Agent, or Firm* — Renner, Otto, Boisselle & Sklar LLP

(57) ABSTRACT

A static mixing device that uniquely utilizes fluid shear, turbulence and impingement in a compact package to mix fluids, in particular liquids, entering the inlet of the device. The static mixing device enables a reduction in dead volume and/or pressure drop when compared to prior art static mixers.

12 Claims, 4 Drawing Sheets

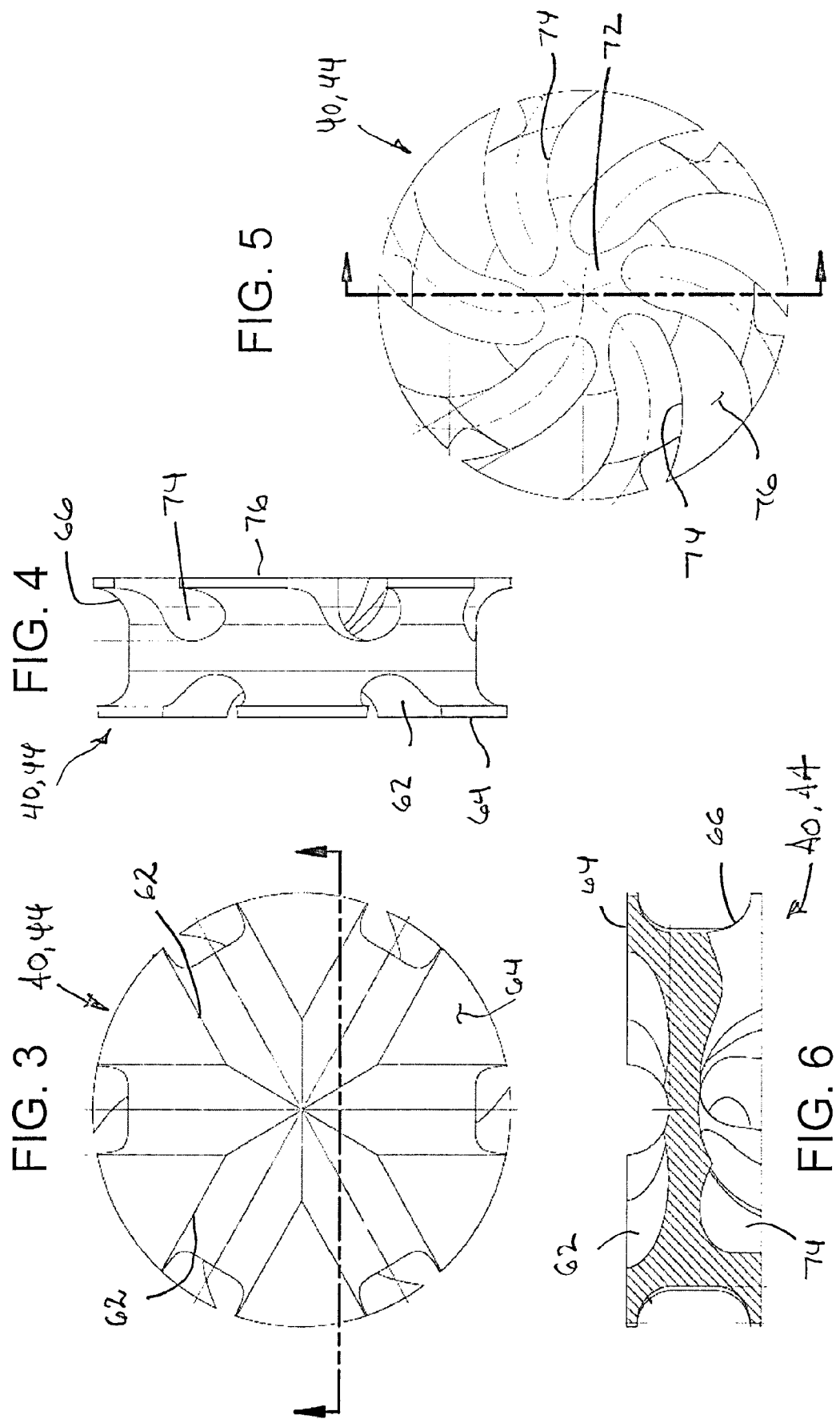

COMPACT STATIC MIXER AND RELATED MIXING METHOD

RELATED APPLICATION

This application is a national phase of International Application No. PCT/US2008/077186 filed Sep. 22, 2008 and published in the English language, which claims the benefit of U.S. Provisional Application No. 60/974,125 filed Sep. 21, 2007, both of which are hereby incorporated herein by reference.

FIELD OF THE INVENTION

The present invention relates to static mixers, static mixer components, and associated methods.

BACKGROUND OF THE INVENTION

Static mixers heretofore have been used to mix and/or condition one or more fluids flowing through the mixer. These mixers typically contain no moving parts and often rely on the division of the flow into smaller flow streams that are forcibly diverted away from neighboring flow streams through the use of baffles or spiral inserts of rigid material inserted into the flow path. The multiple subdivisions and recombinations of the stream within the static mixer effect mixing and/or conditioning of the fluid stream.

In many industries, including the semiconductor industry, the size of the static mixer and it's associated dead volume and pressure drop are considerations in the design of a processing system. A device that can effectively mix fluids in a more compact package with less pressure drop and less dead volume would be highly desirable. Minimizing pressure drop makes the fluid system more efficient and reduction of dead volume reduces waste during flushing and thereby minimizes the latency or lag time between recipe changes and the physical change in the output.

SUMMARY OF THE INVENTION

The present invention provides a static mixing device that uniquely utilizes fluid shear, turbulence and impingement in a compact package to mix fluids, in particular liquids, entering the inlet of the device. The static mixing device enables a reduction in dead volume and/or pressure drop when compared to prior art static mixers.

Accordingly, a static mixing device according to a first aspect of the invention comprises: a fluid mixing chamber extending from a main flow inlet to a main flow outlet; a first stream divider in the fluid mixing chamber downstream of the inlet having plural first channels for dividing (shear) flow from main flow inlet into multiple first streams that are separately directed outwardly away from one another to a first peripheral plenum at an outer periphery of the fluid mixing chamber for recombining of the multiple first streams in the first outer peripheral plenum; a second stream divider in the fluid mixing chamber downstream of the first peripheral plenum having plural second channels for dividing the recombined flow into multiple second streams that are separately directed inwardly toward one another along respective spiral paths to a first inner plenum for recombining of the multiple second streams (turbulence), whereby flow is rotated via the second streams back toward one another for recombining in the first inner plenum; a third stream divider in the fluid mixing chamber downstream of the inner plenum having plural third channels for dividing (shear) flow from the inner plenum into multiple third streams that are separately directed outwardly away from one another to a second peripheral plenum at the outer periphery of the fluid flow passage for recombining of the multiple third streams in the second outer peripheral plenum; and a fourth stream divider in the fluid mixing chamber downstream of the second peripheral plenum having plural fourth channels for dividing the recombined flow in multiple fourth streams that are separately directed inwardly toward one another (impingement) along respective paths that have respective fourth stream outlets opening to a second inner plenum and oriented relative to one another such that opposing fourth flow steams impinge directly into each other in the second inner plenum before flow of the recombined fourth streams toward the outlet.

Additionally or alternatively, the first flow channels, second flow channels, third flow channels and fourth flow channels each may have a total cross-sectional area approximating the cross-sectional area of the main flow inlet.

Additionally or alternatively, the second inner plenum may have a cross-sectional area approximating the cross-sectional area of the main flow inlet.

Additionally or alternatively, the first channels may extend perpendicularly to a center axis of the fluid mixing chamber.

Additionally or alternatively, the third channels may extend outwardly along a spiral path from the first inner plenum to the second peripheral plenum.

Additionally or alternatively, the first flow channels, second flow channels, third flow channels and fourth flow channels each may reside in respective planes longitudinally spaced along a center axis of the fluid mixing chamber.

Additionally or alternatively, the opposing fourth flow streams may be diametrically opposed to maximize the impingement effect of the flow streams.

Additionally or alternatively, the first flow channels, second flow channels, third flow channels and fourth flow channels may be formed by respective grooves formed in respective plates stacked longitudinally in the fluid mixing chamber between the main fluid inlet and outlet.

Additionally or alternatively, the first and second flow channels may be respectively formed on opposite sides of a first plate, and the second and third flow channels may be respectively formed on opposite sides of a second plate.

Additionally or alternatively, the first and second plates may be identical but oppositely oriented within the fluid mixing chamber.

Additionally or alternatively, a further plate be interposed between the plates having formed therein the second and third channels, and the further plate may have a central passage forming part of the first inner plenum.

Further features of the invention will become apparent from the following detailed description when considered in conjunction with the drawings.

BRIEF DESCRIPTION OF DRAWINGS

In the annexed drawings:

FIG. 3 is an axial end view of a mixing element used in the static mixer of FIG. 1;

FIG. 4 is a side view of the mixing element of FIG. 3;

FIG. 5 is an axial end view of the mixing element, looking in a direction opposite that of FIG. 3;

FIG. 6 is a cross-sectional view of the mixing element, taken along the line 6-6 of FIG. 3;

DETAILED DESCRIPTION

Figure 1:
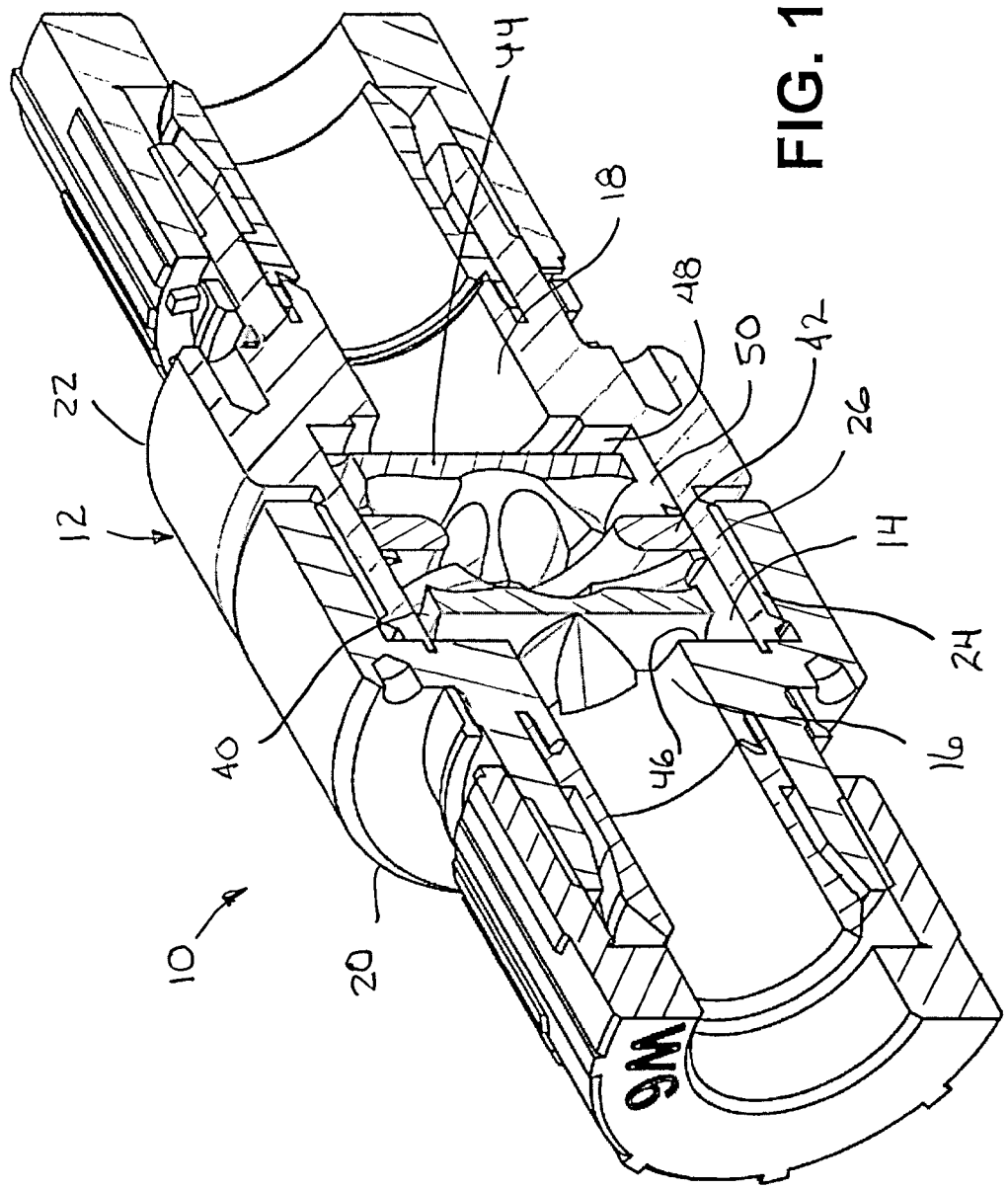
FIG. 1 is a perspective view, partly broken away in section, of an exemplary static mixer according to the invention.
Figure 2:
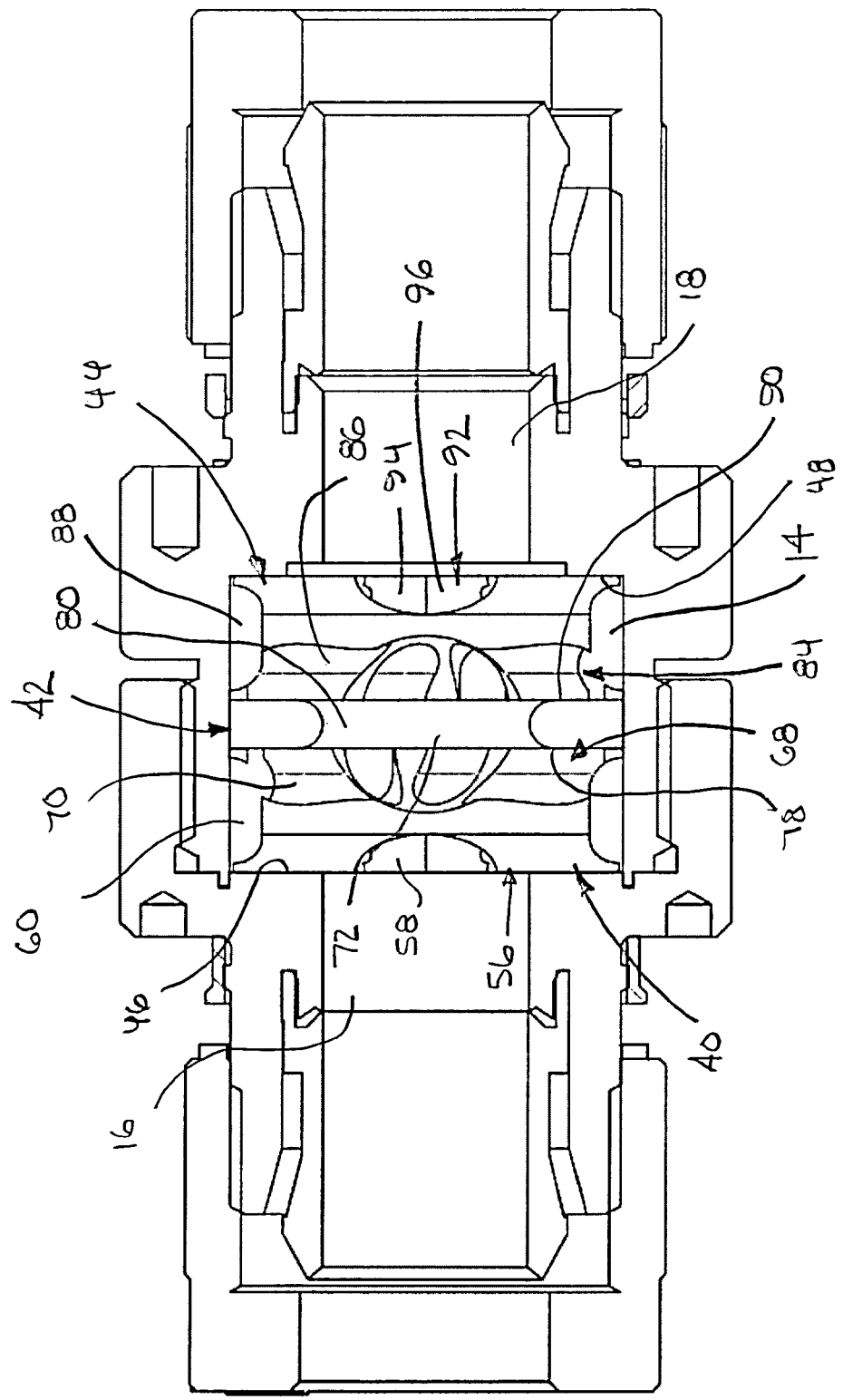
FIG. 2 is a longitudinal sectional view of the static mixer of FIG. 1.

Referring now to the drawings in detail and initially to FIGS. 1 and 2, an exemplary static mixer is indicated generally at 10. The static mixer, also herein referred to as a static mixing device, comprises a mixer body 12 including a fluid mixing chamber 14 that extends from a main flow inlet 16 to a main flow outlet 18. The static mixer may be integrated in a fluid flow system in any suitable manner for a given application. The illustrated static mixer is configured for inline connection between a pair of tubes (not shown).

The mixer body 12 may be formed by two tubular fittings 20 and 22 to facilitate assembly as well as disassembly for cleaning interior components and passages of the static mixer. In the illustrated embodiment, the tubular fitting 20 has at an inner axial end thereof a tubular socket 24 for telescopically receiving a tubular plug projection 26 at the inner axial end of the tubular fitting 22. With this arrangement it is desirable to form the mixing chamber 14 in the tubular fitting 22 with the other tubular fitting closing an axial end of the mixing chamber.

Any suitable means may be used to seal and secure the tubular fittings together. In the illustrated embodiment, the tubular socket 24 is internally threaded at 28 for threaded receipt of the tubular plug projection 26, whereby the fittings 20 and 22 may be screwed together and apart. In addition, the tubular plug projection 26 has an axially extending annular sealing tongue 30 that is received with a tight sealing fit in an annular sealing groove 32 at the bottom of the tubular socket 24 (FIG. 2). The tongue 30 preferably has a radial thickness greater than that of the groove 32 for effecting a tight sealing fit, particularly when the fittings are made of PTFE.

The outer axial ends of one or both of the tubular fittings 20 and 22 may be configured as desired for connection to other fluid conduit components such as tubes or pipes, as may be desired. In other configurations, one or both of the fittings may be integrated into another component, as may be desired.

As seen in FIGS. 1 and 2, the mixing chamber 14 has disposed therein mixing elements 40, 42 and 44 that are stacked axially between opposite end walls 46 and 48 of the mixing chamber. The mixing elements form with the end walls and a peripheral wall 50 (FIG. 1) of the mixing chamber a plurality of stream dividers and plenums. In the illustrated embodiment, the mixing elements 40 and 44 are identical but oppositely oriented. As will be appreciated, this makes the illustrated static mixer bidirectional, in that the inlet and outlet can be reversed. Consequently, the illustrated static mixer can be installed either way in an inline installation.

As seen in FIG. 2 a first stream divider 56 is isolated in the fluid mixing chamber 14 downstream of the main flow inlet 16. The first stream divider 56 has plural first channels 58 for dividing flow from main flow inlet 16 into multiple first streams that are separately directed outwardly away from one another to a first peripheral plenum 60 at an outer periphery of the fluid mixing chamber 14 for recombining of the multiple first streams in the first outer peripheral plenum 60. As seen in FIGS. 3 and 4, in the illustrated embodiment the channels 58 are formed by grooves 62 in an axial end face 64 of the mixing element 40 that abuts the end wall 46. The grooves 62 are coplanar and extend radially outwardly from and perpendicularly to a center axis of the mixing chamber 14. The grooves 62 extend to the first peripheral fluid plenum 60 formed by an annular concave groove 66 (FIG. 4) in the radially outer edge of the mixing element 40.

Referring back to FIGS. 1 and 2, a second stream divider 68 is located in the fluid mixing chamber 14 downstream of the first peripheral plenum 60. The second stream divider 68 has plural second channels 70 for dividing the recombined flow into multiple second streams that are separately directed inwardly toward the longitudinal axis along respective curved (e.g. spiral) paths to a first inner plenum 72 for recombining of the multiple second streams. As best seen in FIGS. 4-6, the channels 70 in the illustrated embodiment are formed by spiral grooves 74 in an axial end face 76 of the mixing element 40 opposite the end face containing the radial grooves, as best seen in FIGS. 4-6. The grooves 74 are coplanar and spiral radially inwardly to the first inner plenum 72 (FIG. 2). The grooves are closed at one side by an axial end face 78 of the mixing element 42.

Figure 7:
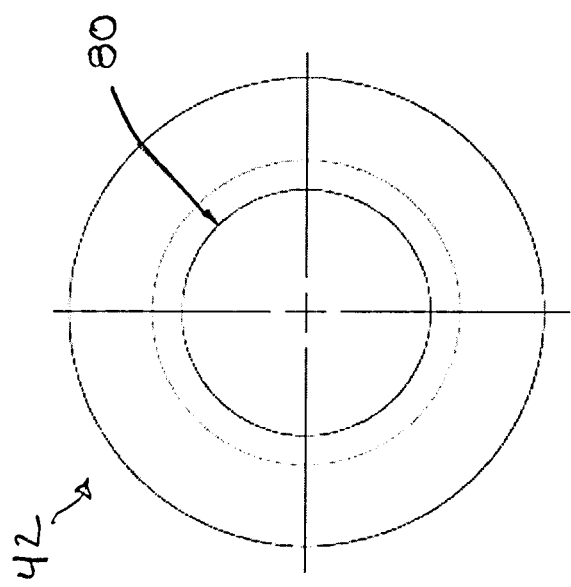
FIG. 7 is an axial end view of another mixing element used in the static mixer of FIG. 1.
Figure 9:
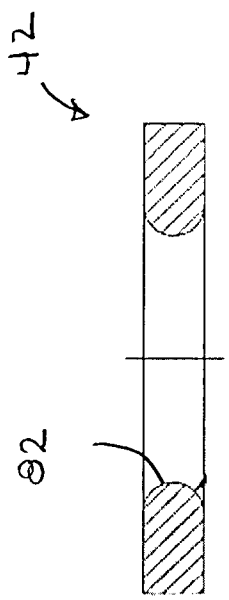
FIG. 9 is a cross-sectional view of the mixing element of FIG. 7, taken along the line 9-9 of FIG. 8.
Figure 8:
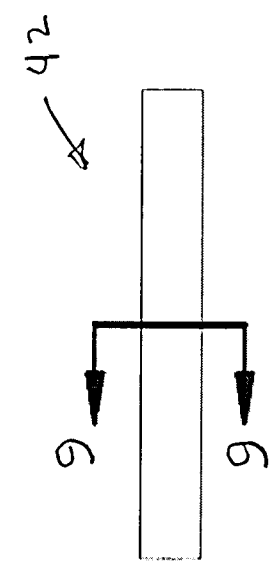
FIG. 8 is a side view of the mixing element of FIG. 7.

As seen in FIGS. 7-9, the mixing element 42 may be in the form of a disc having a center hole 80 that may bounded by a convexly rounded edge 82. In the illustrated embodiment, the center hole 80 is coaxial with the main inlet 16 and outlet 18, as seen in FIG. 2. The center hole 80 preferably has a cross-sectional area approximating the cross-sectional area of the main inlet 16, as may the outlet 18.

Returning to FIG. 2, the center hole 80 of the mixing element 42 forms a continuation of the first inner plenum 72. Recombined flow from the spiral streams passes through the center hole 80 to a third stream divider 84.

The third stream divider 84 is located in the fluid mixing chamber 14 downstream of the inner plenum 72. The third stream divider 84 has plural third channels 86 for dividing flow from the inner plenum 72 into multiple third streams that are separately directed outwardly away from one another to a second peripheral plenum 88 at the outer periphery of the fluid flow passage for recombining of the multiple third streams in the second outer peripheral plenum 88. As seen in FIGS. 4-6, the channels 86 in the illustrated embodiment are formed by the spiral grooves 74 in the axial end face 76 of the mixing element 44, which end face abuts the adjacent axial end face 90 of the mixing element 42 (FIG. 2). The grooves extend to a second peripheral fluid plenum formed by the annular concave groove 66 in the radially outer edge of the mixing element 44.

A fourth stream divider 92 is located in the fluid mixing chamber 14 downstream of the second peripheral plenum 88. The fourth stream divider 92 has plural fourth channels 94 for dividing the recombined center flow in multiple fourth streams that are separately directed inwardly toward the axis along respective paths that have respective fourth stream outlets opening to a second inner plenum 96 communicative with the outlet 18. The outlet ends of the channels 94 are oriented relative to one another such that the opposing fourth flow steams impinge directly into each other in the second inner plenum 96 before flow of the recombined fourth streams toward the outlet 18. In the illustrated embodiment the channels 94 are formed by the grooves 62 (FIG. 4) in the axial end face 64 of the mixing element 44 that abuts the end wall 48. As best seen in FIG. 3, respective pairs of opposed grooves 62 preferably have the downstream ends thereof aligned diametrically opposite one another other to maximize the impingement effect of the flow streams.

As can now be appreciated, the static mixer 10 uniquely combines three fluid technologies in a compact package to completely mix fluids, in particular liquids, entering the inlet of the mixer.

The first technology is fluid shear. The fluid stream that enters the inlet 16 is split into multiple streams which are separately transported by the channels 58 to the outer periphery from the center inlet port 16. The number of flow streams is dependent on many factors including viscosity, and flow velocity. In the example shown the number is six. The total area of the multiple flow streams preferably approximates the inlet port area to aid in minimizing pressure drop in the device.

The second technology is turbulence. The liquid that is in the first peripheral plenum 60 is split into multiple turbulent flow streams by the channels 70 that rotate the fluid back toward the centerline of the device. As above indicated, the center hole or port 80 in the mixing element 42 preferably has a diameter that approximates the inlet port diameter. This minimizes pressure drop. In addition, the smaller diameter of this centerline port 80 compared to the diameter of the outer periphery 50 causes the flow to accelerate its rotational speed and become a homogeneous flow stream as it passes thru the center port 80. The flow stream is again split, i.e. sheared, a second time and is rotated back out to the periphery of the mixing device by the channels 86. Once again the total area of the passages 86 approximates the area of the inlet port to minimize pressure drop.

The third technology is impingement. The fluid is transported from the second peripheral plenum 88 to the centerline of the outlet port by means of multiple flow streams formed by the channels 94 which again approximate the inlet area and are oriented such that opposing flow steams impinge directly into each other. Opposing flow streams preferably are oriented 180 degrees from each other to maximize the impingement effect of the flow streams.

The foregoing enables the provision of a compact mixer having a small length to orifice size ratio considerably less than equivalent capacity prior art mixers. For instance, the compact mixer may have length to orifice size no greater than 10, no greater than 6, no greater than 4 and even no greater than 2. The orifice size is the effective flow diameter of either the inlet 16 or outlet 18 which may be the same, whereas the length of the mixer is the distance between ends walls 46 and 48.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A static mixing device comprising
   a fluid mixing chamber extending from a main flow inlet to a main flow outlet;
   a first stream divider in the fluid mixing chamber downstream of the inlet having plural first channels for dividing flow from main flow inlet into multiple first streams that are separately directed outwardly away from one another to a first peripheral plenum at an outer periphery of the fluid mixing chamber for recombining of the multiple first streams in the first outer peripheral plenum;
   a second stream divider in the fluid mixing chamber downstream of the first peripheral plenum having plural second channels for dividing the recombined flow into multiple second streams that are separately directed inwardly toward one another along respective spiral paths to a first inner plenum for recombining of the multiple second streams, whereby flow is rotated via the second streams back toward one another for recombining in the first inner plenum;
   a third stream divider in the fluid mixing chamber downstream of the inner plenum having plural third channels for dividing flow from the inner plenum into multiple third streams that are separately directed outwardly away from one another to a second peripheral plenum at the outer periphery of the fluid flow passage for recombining of the multiple third streams in the second outer peripheral plenum; and
   a fourth stream divider in the fluid mixing chamber downstream of the second peripheral plenum having plural fourth channels for dividing the recombined flow in multiple fourth streams that are separately directed inwardly toward one another along respective paths that have respective fourth stream outlets opening to a second inner plenum and oriented relative to one another such that opposing fourth flow streams impinge directly into each other in the second inner plenum before flow of the recombined fourth streams toward the outlet;
   wherein the static mixing device has a longitudinal axis; and
   wherein the first flow channels, second flow channels, third flow channels and fourth flow channels are formed by respective grooves formed in respective axially facing side surfaces of respective plates stacked longitudinally in the fluid mixing chamber between the main fluid inlet and outlet.

2. A static mixing device as set forth in claim 1, wherein the first flow channels, second flow channels, third flow channels and fourth flow channels each have a total cross-sectional area approximating the cross-sectional area of the main flow inlet.

3. A static mixing device as set forth in claim 1, wherein the second inner plenum has a cross-sectional area approximating the cross-sectional area of the main flow inlet.

4. A static mixing device as set forth in claim 1, wherein the first channels extend perpendicularly to a center axis of the fluid mixing chamber.

5. A static mixing device as set forth in claim 1, wherein the third channels extend outwardly along a spiral path from the first inner plenum to the second peripheral plenum.

6. A static mixing device as set forth in claim 1, wherein the first flow channels, second flow channels, third flow channels and fourth flow channels each reside in respective planes longitudinally spaced along a center axis of the fluid mixing chamber.

7. A static mixing device as set forth in claim 1, wherein the opposing fourth flow streams are diametrically opposed to maximize the impingement effect of the flow streams.

8. A static mixing device as set forth in claim 1, wherein the first and second flow channels are respectively formed on opposite sides of a first plate, and the second and third flow channels are respectively formed on opposite sides of a second plate.

9. A static mixing device as set forth in claim 8, wherein the first and second plates are identical but oppositely oriented within the fluid mixing chamber.

10. A static mixing device as set forth in claim 1, wherein a further plate is interposed between the plates having formed therein the second and third channels, and the further plate has a central passage forming part of the first inner plenum.

11. A static mixer comprising:
- a generally tubular body having an inlet port and an outlet port, the body extending intermediate the inlet and the outlet port along a longitudinal axis;
- a first mixing element received within the body coaxially with the longitudinal axis of the body, the first mixing element having a first axial end face disposed opposite the inlet port and a second axial end face opposite the first axial end face, and having a peripheral channel extending circumferentially about the axis intermediate the first and the second axial end faces, the first axial end face having an array of first channels formed therein radiating outwardly from the longitudinal axis and opening into the peripheral channel, and the second axial end face having an array of second channels formed therein radiating helically outwardly from the longitudinal axis and opening into the peripheral channel; and
- a second mixing element received within the body coaxially with the longitudinal axis of the body, the second mixing element having a first axial end face disposed opposite the second axial end face of the first mixing element, and a second axial end face disposed opposite the outlet port, and having a peripheral channel extending circumferentially about the axis intermediate the first and the second axial end faces, the first end face having an array of first channels formed therein radiating outwardly from the longitudinal axis and opening into the peripheral channel, and the second end face having an array of second channels formed therein radiating helically outwardly from the longitudinal axis and opening into the peripheral channel;
- whereby fluid flow into the inlet port is sheared by the first channels of the first mixing element into separate flow streams, each of the streams flowing into the peripheral channel of the first mixing element and being directed by the second channels of the first mixing element as a generally helical flow to the second mixing element, and
- whereby the helical flow is sheared by the second channels of the second mixing element into separate flow streams, each of the streams flowing into the peripheral channel of the second mixing element and being directed by the second channels of the second mixing element to impinge upon each other before flowing out of the outlet port.

12. The mixer of claim 11, further comprising an intermediate port defined between the first and the second mixing elements, the helical flow from the first mixing element being directed through the intermediate port before flowing to the second mixing element.

* * * * *